United States Patent [19]

Bich

[11] 4,413,817

[45] Nov. 8, 1983

[54] PLUG DEVICE FOR THE PENETRATION OF A PLUNGER ROD INTO A CYLINDER OF GAS SPRING OF THE LIKE

[75] Inventor: Rene Bich, Maisons-Laffitte, France

[73] Assignee: Societe J. G. Allinquant, Gentilly, France

[21] Appl. No.: 113,036

[22] Filed: Jan. 17, 1980

[30] Foreign Application Priority Data

Jan. 17, 1979 [FR] France ................ 79 01107

[51] Int. Cl.³ ............................................. F16F 9/36
[52] U.S. Cl. ............................ 267/64.11; 188/322.17
[58] Field of Search .................... 188/322, 322.17; 267/64 R, 65 R, 124, 136, 64.11

[56] References Cited

U.S. PATENT DOCUMENTS

| | | | |
|---|---|---|---|
| 2,352,401 | 6/1944 | O'Connor | 188/269 |
| 3,731,914 | 5/1973 | Cope et al. | 267/65 R |
| 3,856,287 | 12/1974 | Freitag | 188/269 |
| 3,927,871 | 12/1975 | de Baan | 267/65 R |
| 4,064,977 | 12/1977 | Taylor | 267/65 R |
| 4,079,925 | 3/1978 | Salin | 188/322 |
| 4,089,512 | 5/1978 | Allinquant et al. | 267/65 R |
| 4,189,033 | 2/1980 | Katsumori | 188/322 |
| 4,194,731 | 3/1980 | Marx | 267/65 R |

FOREIGN PATENT DOCUMENTS

| | | | |
|---|---|---|---|
| 2144 | 10/1978 | European Pat. Off. | 188/322 |
| 1164155 | 9/1969 | United Kingdom | 188/300 |

*Primary Examiner*—Gregory N. Clements
*Attorney, Agent, or Firm*—Staas & Halsey

[57] ABSTRACT

The cylinder of a gas spring has a bottom constituted by a plug designed for allowing gastight penetration of a plunger rod into the cylinder thanks to a seal having a lip surrounding this rod in sliding frictional engagement therewith. The seal is sandwiched between two annular holders respectively located on the outer side and on the inner side of the seal. The outer holder plays the part of a mechanical guide for the plunger rod whereas the inner holder plays the part of an oil retainer for lubrication of the seal lip.

4 Claims, 3 Drawing Figures

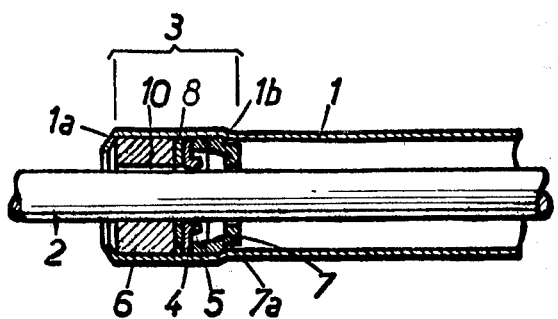
FIG.: 1
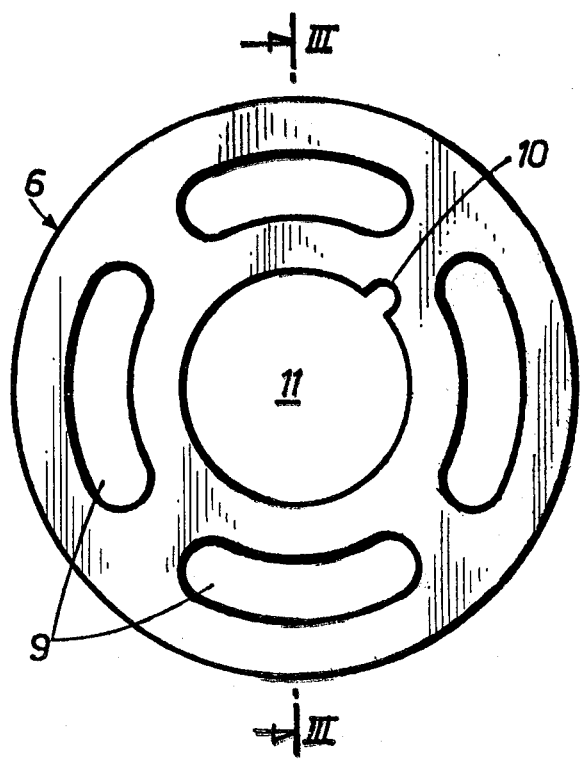
FIG.: 2
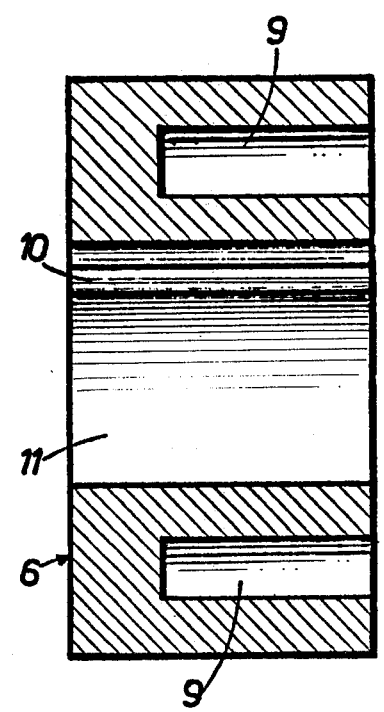
FIG.: 3

PLUG DEVICE FOR THE PENETRATION OF A PLUNGER ROD INTO A CYLINDER OF GAS SPRING OF THE LIKE

BACKGROUND OF THE INVENTION

Use is currently made in the automobile industry of telescoping systems operating as pneumatic or gas springs for assisting the opening of raisable horizontally-hinged car-body covers such as a rear gate or a front hood. Such gas springs basically comprise a plunger rod which gastightly penetrates into a cylinder filled with a gas under pressure such as nitrogen: upon introduction of the plunger rod inside the cylinder, there occurs a supplemental compression of the gas which acts on the inner free end of the rod and tends to project the latter outside the cylinder.

A description of the structure and operation of an apparatus of this type is given in Allinquant et al. 4089512 which further describes a specific sealing system fitted at one end of the cylinder and traversed by the plunger rod.

SUMMARY OF THE INVENTION

The present invention relates to a telescoping apparatus of this kind and concerns more specifically an alternative embodiment of the sealing system of the above-mentioned patent.

The object of this invention is to provide a seal which has a lip surrounding the plunger rod in sliding frictional engagement therewith and which is sandwiched between two annular holders, namely a first holder located on the outer side and acting as a mechanical guide for the axial movement of the rod, and a second holder located on the inner side and acting both as an oil retainer for the lubrication of the seal lip and as a stop for limiting the stroke of said plunger rod in the direction of telescoping extension out of the cylinder.

According to a feature of the present invention, these annular holders are designed and arranged for allowing some degree of swivelling to the apparatus should radial stresses be exerted on the rod. To this effect, one of the annular holders or both can be made of an adequate plastic material such as an acetal resin (formaldehyde polymer) sold under the trademark "Delrin". The first holder acting as guide presents recesses formed in its body in order to confer the desired swivelling capacity. The second holder presents on its outer surface an annular set-back for locking the assembly thanks to an adequate deformation of the cylinder wall at the level of this set-back.

BRIEF DESCRIPTION OF THE DRAWINGS

FIG. 1 is a fragmentary axial section of a gas spring equipped with an improved plug device in accordance with a preferred embodiment of the present invention.

FIG. 2 is a larger scale end view of the annular guide of this device.

FIG. 3 is a diametrical section taken along line III—III of FIG. 2.

DESCRIPTION OF THE PREFERRED EMBODIMENT

In the drawings, reference numeral 1 designates the cylinder of a gas spring filled with nitrogen or other gas under pressure, and at one end of which a plunger rod 2 penetrates through a plug device generally designated by the reference numeral 3 and provided with an adequate annular seal 4 having a lip 5 slidably rubbing all around rod 2. Up to this point, the assembly is quite conventional and is disclosed among others in the above-mentioned patent.

According to the present invention, seal 4 is tightly held in the plug device 3 between two annular holders 6 and 7 which are themselves locked at the end of cylinder 1 between its turned over terminal edge 1a and a shoulder 1b of its wall.

The annular member 6 which is located at the outer side of the plug device 3 and which is applied against seal 4 through a washer 8, acts as a guide for the plunger rod 2. It can be made of a fritted material, but will be preferably of "Delrin" or other convenient plastic material offering better slidability. Its body comprises recesses 9 numbering four in the illustrated example and providing the noteworthy advantages of:

facilitating molding, allowing some degree of swivelling under radial stresses exerted on the rod 2, avoiding transmission to bore 11 of strains which could be caused upon closure of the apparatus by crushing its terminal edge 1a.

A groove 10 is formed along a generatrix of bore 11 in order to facilitate filling the apparatus with pressure gas.

As far as the second annular holder 7 is concerned, it has the general shape of a socket having an outer set-back tier 7a which allows locking of the plug device 3 between the end crimping 1a and the shoulder 1b which can be a mere notch, this locking having further for effect to compress the rubber rim of seal 4 in contact engagement with the inner wall of tube 1. This annular holder 7 forms a reserve, the outline of which permits, during the swinging movements of the apparatus, to retain an amount of oil sufficient for lubricating lip 5 of seal 4. It also acts as an expansion abutment, limiting the outward stroke of rod 2 (the piston, not shown, which is carried by this rod then abuts against member 7).

I claim:

1. Pneumatic spring apparatus having a cylinder, a trio plug device forming a closure at an end of said cylinder, and a reciprocable plunger rod slidably fitted through said plug device for operation in said cylinder, said trio plug device consisting of three elements in axial succession: a first annular holder member located at the outer side of said trio plug device including means of such design as to be rigid enough for mechanical guidance of said plunger rod in its reciprocation while being yieldable enough for allowing a degree of swivelling upon exertion of radial stresses on said rod, an intermediate annular gastight seal of resilient material having a central axially extending lip surrounding said rod and in direct sliding frictional engagement therewith, and a second annular holder member located at the inner side of said trio plug device including further means for oil retention to lubricate said seal lip, said seal being tightly sandwiched between said first and second holder members.

2. Apparatus according to claim 1, wherein said means of said first annular holder member comprises a recessed body portion having a plurality of close-contour indentations formed therein to impart thereto capacity for said swivelling.

3. Apparatus according to claim 2, wherein said indentations are arcuately spaced from each other in cross-section and distributed around the axis of said body portion.

4. Apparatus according to claim 2, wherein said first annular holder member is made of an acetal resin (formaldehyde polymer).

* * * * *